(12) United States Patent
Bates

(10) Patent No.: US 7,942,190 B2
(45) Date of Patent: May 17, 2011

(54) PROCESS FOR REPAIRING INLET PORTS OF AN EXTRUDER DIE

(76) Inventor: Charles E. Bates, Birmingham, AL (US)

( * ) Notice: Subject to any disclaimer, the term of this patent is extended or adjusted under 35 U.S.C. 154(b) by 0 days.

(21) Appl. No.: 12/567,280

(22) Filed: Sep. 25, 2009

(65) Prior Publication Data

US 2011/0073268 A1 Mar. 31, 2011

(51) Int. Cl.
*B22D 19/10* (2006.01)
*B23K 31/00* (2006.01)
*B23K 9/04* (2006.01)

(52) U.S. Cl. ..... 164/92.1; 228/119; 219/76.1; 29/402.18
(58) Field of Classification Search ................. 164/92.1; 219/76.1; 228/119; 29/402.18
See application file for complete search history.

(56) References Cited

U.S. PATENT DOCUMENTS

| 4,394,879 | A | * | 7/1983 | Reynolds | 164/76.1 |
| 5,511,721 | A | * | 4/1996 | Demo et al. | 228/216 |
| 5,720,987 | A | * | 2/1998 | Ploog | 425/131.1 |
| 2007/0084906 | A1 | * | 4/2007 | Vargas et al. | 228/119 |

* cited by examiner

*Primary Examiner* — Kevin P Kerns
(74) *Attorney, Agent, or Firm* — Gerald M. Walsh; Kenneth M. Bush; Bush Intellectual Property Law

(57) ABSTRACT

A process for repairing one or more worn inlet ports on an interior or exterior surface of an extruder die wherein each inlet port provides an opening into an extrusion channel. The worn inlet port has a funnel shape and a diameter greater than that of the extrusion channel. The worn inlet port is repaired by placing a fused silicon oxide insert into one or more extrusion channels so that an external surface of the insert engages the interior surface of the extrusion channel, thereby forming a pocket around the insert between the circumference or perimeter of the worn inlet port and the external surface of the insert. The pocket is filled with molten metal, and the insert prevents the molten metal from entering the extrusion channel. When the molten metal hardens the inserts are removed. New inlet ports are thereby formed having the same diameter as the extrusion channels.

19 Claims, 4 Drawing Sheets

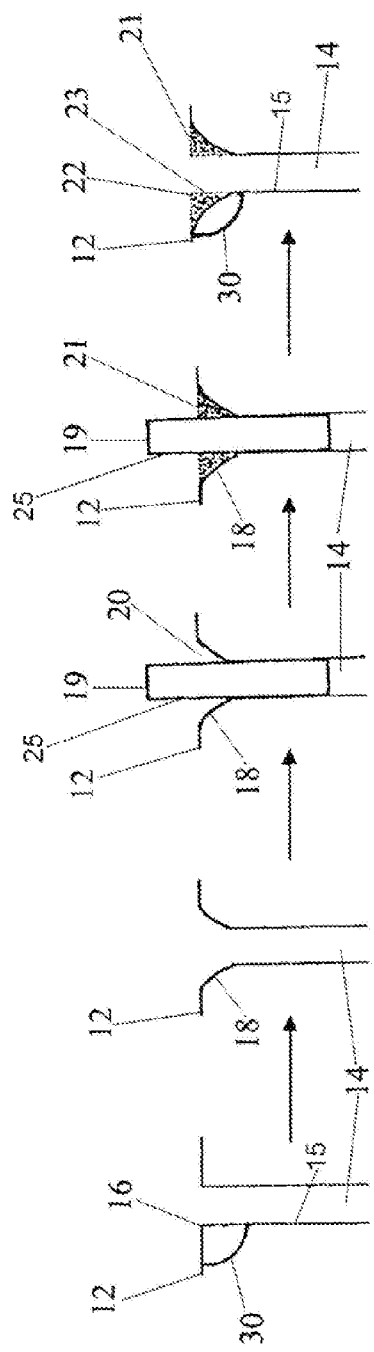
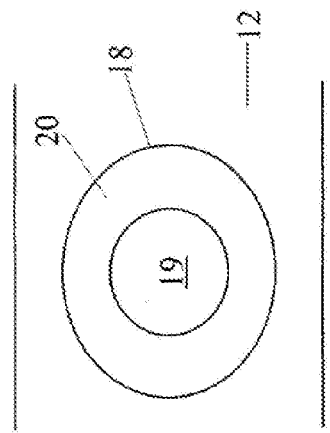
Fig. 7a  Fig. 7b  Fig. 7c  Fig. 7d  Fig. 7e
Fig. 8

PROCESS FOR REPAIRING INLET PORTS OF AN EXTRUDER DIE

BACKGROUND OF THE INVENTION

1. Field of the Invention

The present invention relates to extruder dies and, more particularly, to processes for repairing the worn inlet ports of extrusion channels in extruder dies.

2. Technical Background

Extruders are widely used in a number of industries, especially in the food industry. Edible material in powder or dough form is introduced into an extruder and then forced into an extruder die inlet port. The extruder die has the shape of the desired product. The extrudate will take the shape into which it is formed coming out through the extruder die outlet. The extrudate is generally continuous but can be cut into desired lengths after being extruded out of the die. In some extruder dies the inlet ports can become worn with use, resulting in increasing amounts of power or pressure required to force the material into the inlet ports and through extrusion channels. This can cause the motors driving the extruder to consume excessive energy and reduce the output of the extruder system.

FIG. 1 shows an example of a circular extruder die 10 having interior area 11. An extruder (not shown) is positioned within the interior area 11 and forces powdered or other type material into the inlet ports 16 positioned on the interior surface 12 of the extruder die 10. The inlet port 16 provides an opening into an extrusion channel 14 (see FIG. 2). The material is then forced through extrusion channels 14 to the exterior surface 13 of the extruder die 10, and out through exit port 17. As the material is forced out through exit port 17, the material can be cut into any desired lengths. In a proper and unworn condition of the extruder die 10, as shown in FIG. 2, the interior surface 12 forms an approximate right angle with the internal surface 15 of the extrusion channel 14. This creates a sharp edge on the inlet port 16. This sharp edge may be chamfered when extruding some materials to aid the product entrance into the extrusion channel. FIG. 3 illustrates worn inlet ports 18 where interior surface 12 and the worn inlet port 18 form a funnel shape. This effect of producing a worn inlet port 18 in an extruder die 10 can occur in a few days of operation when the extrudate is abrasive. There is no known practical or commercially feasible process for repairing the worn inlet ports 18 to restore them to their original sharp-edged condition. These types of extrusion dies 10 may contain thousands of inlet ports 16 and extrusion channels 14. Consequently it has been necessary to replace worn extruder die 10 with a new extruder die 10, which adds a significant expense to the product produced with the extruder die 10. What is needed is a simple, rapid, inexpensive process for restoring the worn inlet ports 18 of extrusion channels 14.

SUMMARY OF THE INVENTION

The present invention is a process for repairing a worn inlet port of one or more extrusion channels on the interior or exterior surface of a metallic extruder die. The process is applied to worn inlet ports in which the circumference or perimeter of the inlet port has become substantially greater than the circumference or perimeter of the extrusion channel. A worn inlet port results from the continued extrusion of materials through the inlet port. An insert is placed into one or more extrusion channels through the worn inlet port so that the external surface of the insert engages the interior surface of the extrusion channel. A pocket is formed around the insert between the circumference or perimeter of the worn inlet port and the external surface of the insert. This pocket is then filled with molten metal, wherein the insert prevents the molten metal from entering the extrusion channel. The molten metal is allowed to harden and the insert is removed from the extrusion channel. A new inlet port is thereby formed having a shape and circumference or perimeter similar to that of the extrusion channel. The new inlet port functions as well as the original unworn inlet port. This process of repair can be repeated as often as desired on an extruder die.

The insert used in this process must have a melting point above 3000 degrees F., the deposited metal must not stick to the insert, and the insert must have a low coefficient of thermal expansion so that the insert will not explode in the presence of temperatures required to deposit molten metals. Any suitable type of metal deposition process may be used with any suitable type of abrasion resistant metal or metal alloy.

An advantage of the present invention is a process to rapidly and inexpensively repair inlet ports on an extruder die as often as needed.

Another advantage is a means for repairing the inlet ports of an extruder die without molten metal entering the extrusion channels of the extruder die.

Another advantage is the use of a fused silicon oxide insert for reversible placement in an extrusion channel to prevent molten metal from entering the extrusion channel.

Another advantage is the ability to use any type of metal deposition process with any type of metal or metal alloy to repair the inlet ports of an extruder die.

BRIEF DESCRIPTION OF THE DRAWINGS

FIGS. 7a-e illustrate the sequence of events of an inlet port becoming worn and being repaired by the process of the present invention.

FIG. 8 presents a top view of FIG. 7c, showing the pocket around the insert which is filled with molten metal to repair the inlet port.

DETAILED DESCRIPTION OF THE INVENTION

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

Figure 1:
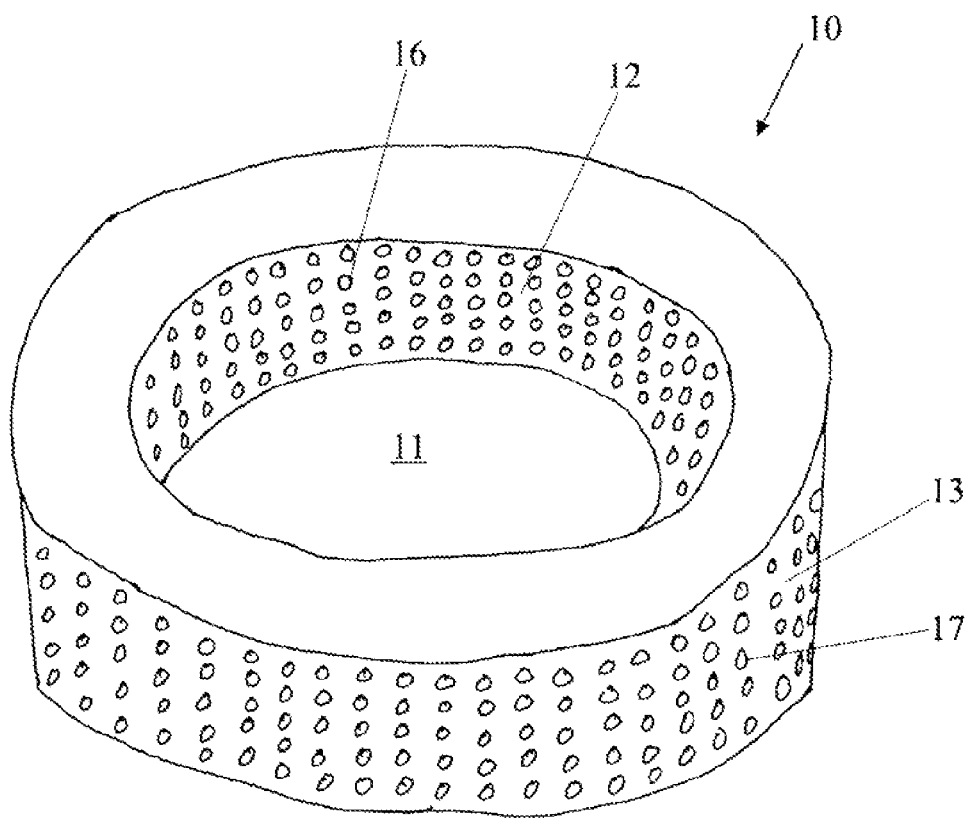
FIG. 1 shows an example of an extruder die with a plurality of inlet ports.
Figure 2:
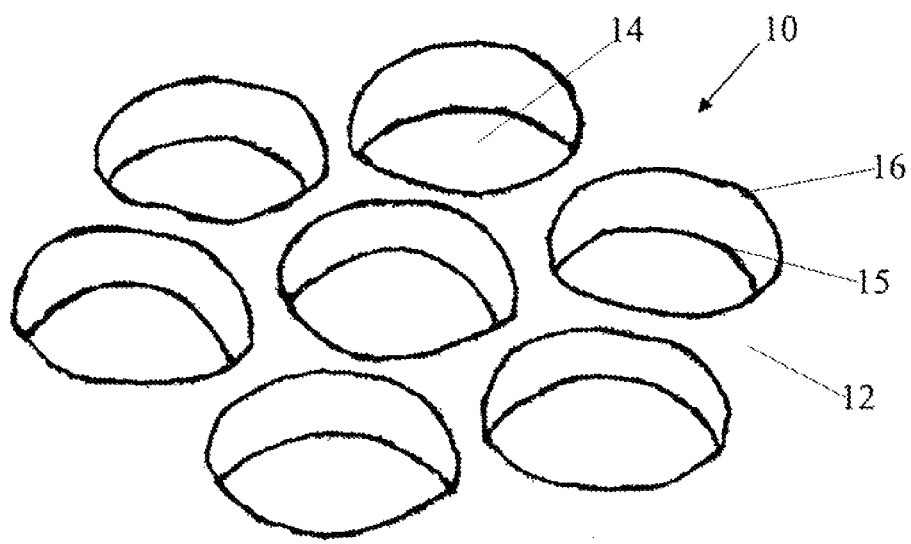
FIG. 2 shows a detailed illustration of inlet ports on an extruder die.
Figure 3:
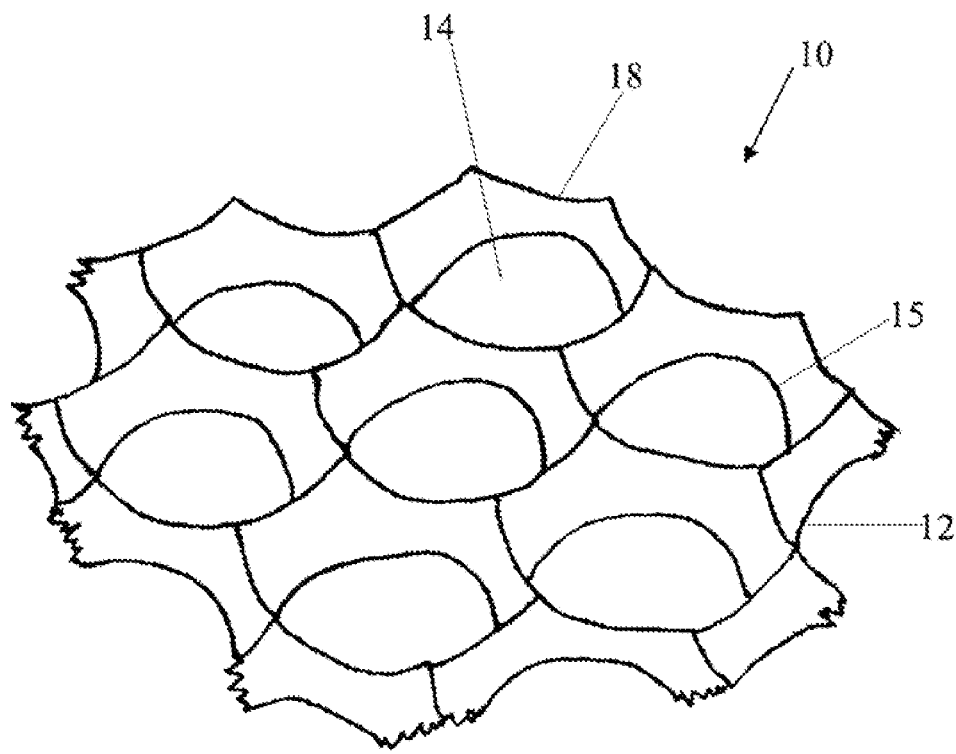
FIG. 3 shows a detailed illustration of the appearance of inlet ports worn or damaged by repeated extrusion of materials through the inlet ports.
Figure 4:
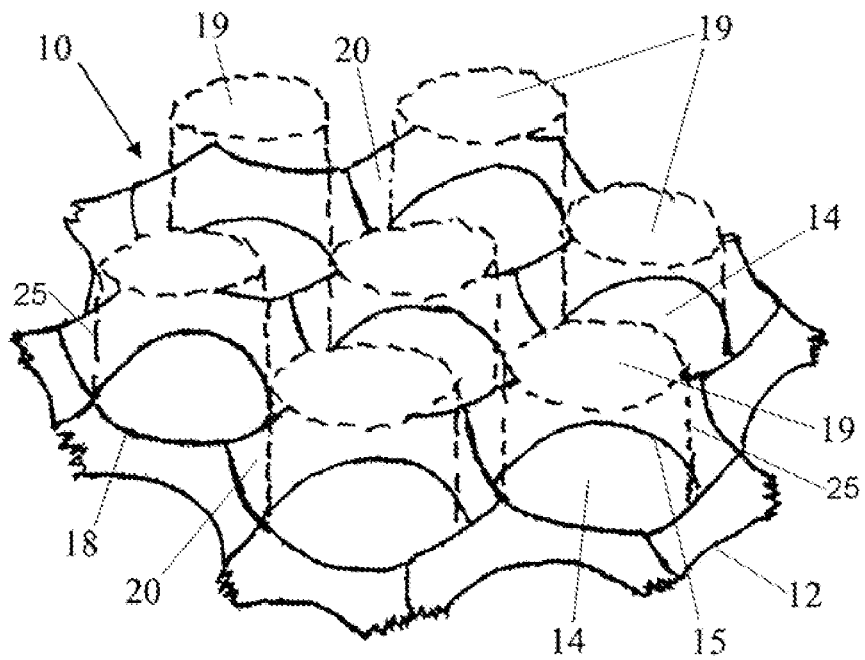
FIG. 4 shows the placement of inserts into the worn inlet ports and extrusion channels of an extruder die in order to repair the worn inlet ports with molten metal deposition.

FIG. 4 shows the placement of inserts 19 into the worn inlet ports 18 and extrusion channels 14 of an extruder die 10 in order to repair the worn inlet ports 18 with molten metal. The insert 19 is configured to fill the entire cross section of each extrusion channel 14 so that the exterior surface 25 of the insert 19 engages the internal surface 15 of the extrusion channel 14. This produces a close tolerance fit of the insert 19 in the extrusion channel 14 and effectively plugs the extrusion channel 14 so that no liquid metal can enter the extrusion channel 14. The example shown in FIG. 4 is a cylindrical insert 19 inserted into a cylindrical extrusion channel 14. However, the insert 19 can be constructed into any shape to coincide with the corresponding shape of the extrusion channel 14. When the insert 19 is in the extrusion channel 14 a pocket 20 is formed around the insert 19 by the worn inlet port 18 (see FIG. 7c and FIG. 8). This pocket 20 can be filled with molten metal so that the worn inlet port 18 is restored to the shape and condition of the original inlet port 16.

Figure 5:
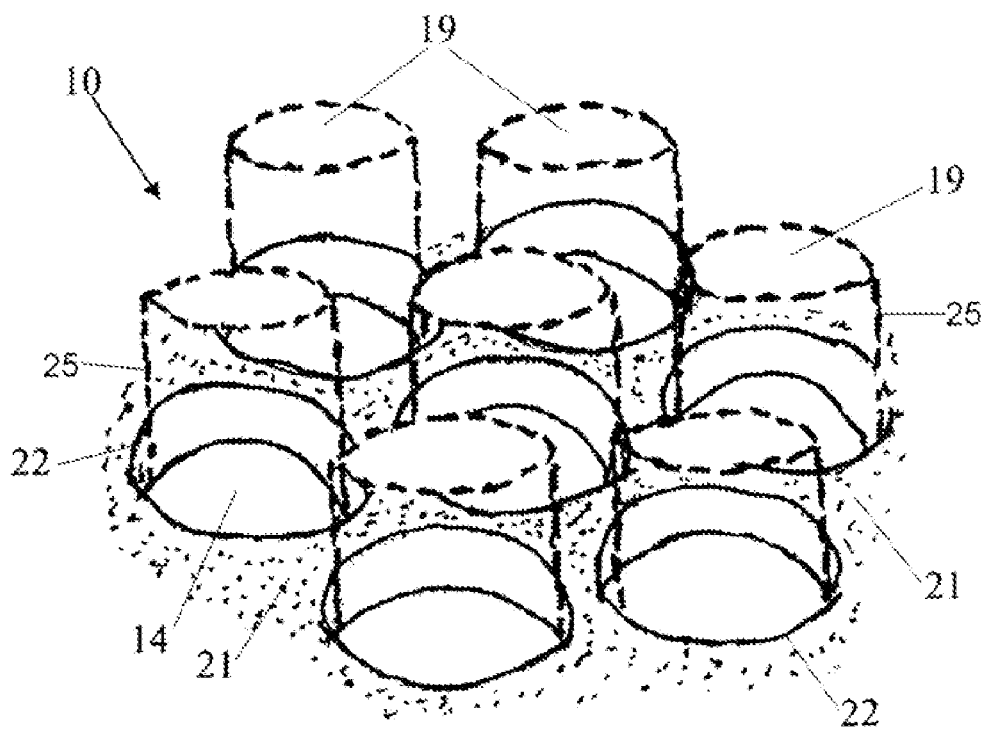
FIG. 5 illustrates the deposition of molten metal around the inserts placed in the worn inlet ports and extrusion channels.
Figure 6:
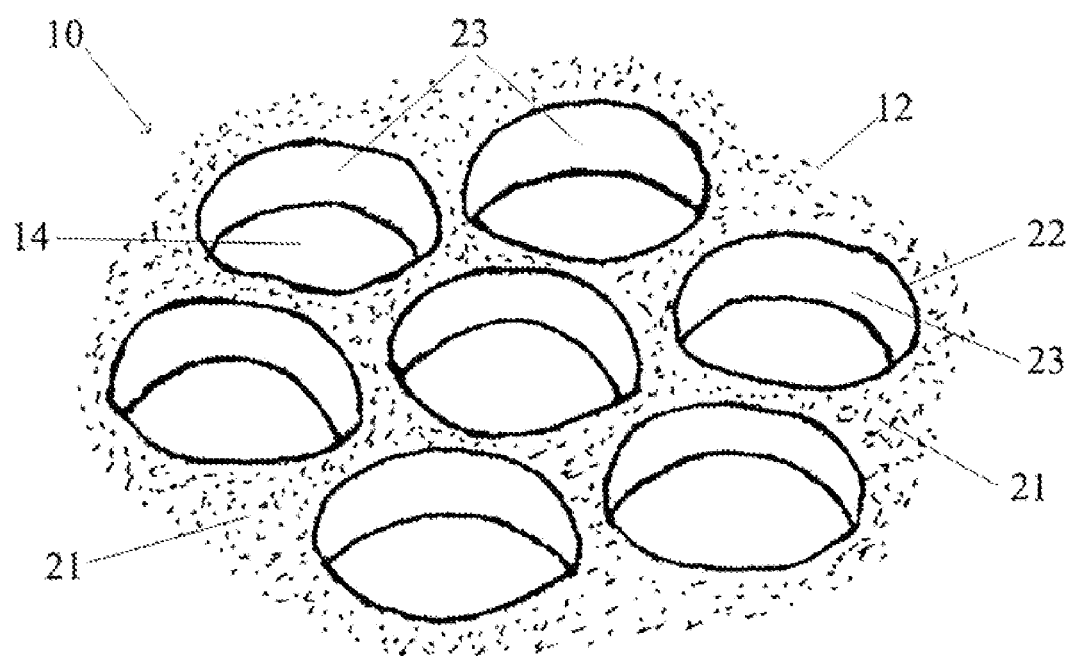
FIG. 6 illustrates the restored and repaired inlet ports after removal of the inserts.

FIG. 5 shows the pockets 20 filled with new metal 21 creating a repaired or new inlet port 22. FIG. 6 shows the new inlet ports 22 with the inserts 19 removed. The new fill metal 21 restores a flat interior surface 12 of the extruder die 10, and creates a new internal surface 23 in the extrusion channel 14 adjoining the new inlet port 22. This deposition of metal restores an approximate 90 degree configuration to the new internal surface 23 of the extrusion channel 14 and the interior surface 12 of the extruder die 10 so that the new inlet port 22 has a sharp cutting-edge similar to that of the original inlet port 16. This sharp edge may be slightly rounded or chamfered, if desired, depending on the flow characteristics of the material being extruded.

FIGS. 7a-e illustrate the sequence of events that occur with the use of a new extruder die 10 in which the original inlet ports 16 become worn inlet ports 18 and then become repaired by the process of the present invention to create new inlet ports 22. FIG. 7a shows an extrusion channel 14 of a new extruder die 10. The extrusion channel 14 has an internal surface 15 which meets the interior surface 12 of the extruder die 10 at an approximate 90 degree angle 30, creating an inlet port 16 with a sharp cutting edge, which may subsequently be rounded or chamfered if desired. The extruder die 10 is used for the extrusion of various materials through the inlet ports 16 and extrusion channels 14. These materials include, but are not limited to, wood shavings, shredded wood, combinations of wood and plastic, horse feed, cow feed, rabbit feed, chicken feed, and the like. The extrusion process allows the formation of cylindrical pellets or other extruded shapes.

Over a period of perhaps 200 hours of continued use of an extruder die 10, depending on the abrasiveness of the material being extruded, worn inlet ports 18 are created by the forces and abrasion associated with pushing materials into the extruder channels 14. A worn inlet port 18 is illustrated in FIG. 7b. The approximate 90 degree angle 30 forming the inlet port 16 is destroyed, creating a funnel shaped worn inlet port 18. This worn inlet port 18 cannot be repaired by simply filling the inlet ports 18 with molten metal and then drilling holes to restore the inlet port. Filling the ports with abrasion resistant metal would make it very difficult and expensive to re-drill the holes and might cost more than manufacturing a new extruder die 10.

The process of the present invention has solved this problem by plugging the extrusion channel 14 with an insert 19, as shown in FIG. 7c. The funnel-shaped inlet port 18 forms of pocket 20 around the insert 19. FIG. 8 shows a top view of the insert 19, pocket 20, and worn inlet port 18 as depicted in FIG. 7c. Insert 19 forms a tight, reversible, friction fit in the extrusion channel 14.

FIG. 7d illustrates the filling of pocket 20 with molten metal 21 using metal deposition procedures well known in the art. The molten metal 21 fills only the pocket 20 and does not enter the extrusion channel 14 because of the plugging effect of insert 19. When the molten metal 21 hardens, the insert 19 can be removed from each extrusion channel 14 as shown in FIG. 7e. The insert 19 can be removed by pulling it out, or tapping it out from within the extrusion channel 14 using a pin, rod, or punch. The new hardened metal 21 restores the damaged interior surface 12 of the extruder die 10 and the damaged internal surface of the extrusion channel 14, forming a repaired internal surface 23 of the extrusion channel 14. The repaired interior surface 12 and the repaired internal surface 23 form an 85 to 95 degree, preferably 90 degree, angle 30 establishing a new inlet port 22 similar to the original inlet port 16. The new inlet port 22 has a sharp cutting-edge which allows proper operation of the extruder and extruder die 10. This edge may be chamfered if desirable to facilitate flow through the extrusion channel.

The insert 19 used in the process of the present invention must have certain properties. The insert 19 must be made of material that has a melting point above 3000 degree F., or be constructed so as not to melt at temperatures up to 3000 degrees F. The insert 19 must not stick or adhere to the deposited molten or hardened metal and it must not become permanently fixed within the extrusion channel 14. The insert 19 must have a low coefficient of thermal expansion so that it will not explode when exposed to the heat of metal deposition, or be constructed so that it will not explode when exposed to the heat of metal deposition. The insert 19 can be made of metal, metal oxide, or metal nitride. The insert can be structured as a water cooled device made of metal or metal carbide. The preferred substance for forming the insert 19 is fused silicon oxide. The insert 19 can be coated with an oxide, graphite, nitride, or carbide, or other material to prevent or minimize molten or hardened metal from sticking or adhering to insert 19, and to facilitate removal of insert 19 from the extrusion channel 14 and new let inlet port 22.

The process of the present invention can repair hundreds or thousands of inlet ports simultaneously in an extruder die using metal deposition with inserts 19. Any suitable metal deposition procedure can be used such as, for example, plasma vapor deposition, gas vapor deposition, plasma arc welding, metal inert gas welding, tungsten inert gas welding, and the like. Any abrasion resistant material or alloy may be used to rebuild the interior surface 12 and the worn inlet ports 18 of the extruder die 10, including, but not limited to, metal carbides, metal nitrides, and metal oxides that will bond to the base metal of the extruder die 10.

The foregoing description has been limited to specific embodiments of this invention. It will be apparent, however, that variations and modifications may be made by those skilled in the art to the disclosed embodiments of the invention, with the attainment of some of all of its advantages and without departing from the spirit and scope of the present invention. For example, any size or shape extruder die may be repaired by the process of the present invention. Any size or shape inlet port may be repaired by this process. The metal deposition process may be fully automated or computerized by methods well known in the art. The deposited new metal can be tempered, finished, or polished as desired.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:
1. A process for repairing one or more inlet ports on an interior or exterior surface of an extruder die wherein each inlet port provides an opening into an extrusion channel and wherein a circumference or perimeter of the inlet port is greater than a circumference or perimeter of an interior surface of the extrusion channel, comprising:
1) placing an insert in one or more inlet ports and extrusion channels so that an external surface of said insert engages the interior surface of the extrusion channel;
2) forming a pocket around said insert between the circumference or perimeter of the inlet port and said external surface of said insert;
3) filling said pocket around said insert with molten metal by metal deposition using welding, wherein said insert prevents said molten metal from entering the extrusion channel;
4) allowing said molten metal to form hardened abrasion resistant metal, and removing said insert from the extrusion channel, thereby forming a new inlet port having the same circumference or perimeter as the interior surface of the extrusion channel and having a cutting edge; and
5) chamfering said cutting edge to facilitate flow through the extrusion channel.

2. The process of claim 1 wherein said hardened metal forms an 85 to 95 degree angle between said interior surface of the extruder die and said internal surface of the extrusion channel.

3. The process of claim 1 wherein said insert has a melting point above 3000 degrees F., does not melt at welding temperatures, does not stick or adhere to said molten metal or to said hardened abrasion resistant metal, and will not explode when exposed to heat from said metal deposition.

4. The process of claim 1 wherein said insert is made of metal, metal oxide, or metal nitride, or is constructed as a water cooled device made of metal or metal carbide.

5. The process of claim 1 wherein said insert is made of silicon oxide.

6. The process of claim 4 wherein said insert is coated with an oxide, graphite, carbide or other heat resistant material.

7. The process of claim 5 wherein said insert is coated with an oxide, graphite, carbide or other heat resistant material.

8. The process of claim 1 wherein said welding is plasma arc welding, metal inert gas welding, or tungsten inert gas welding, or a combination thereof.

9. A process for repairing one or more inlet ports on an interior or exterior surface of an extruder die wherein each inlet port provides an opening into an extrusion channel and wherein a circumference or perimeter of the inlet port is greater than a circumference or perimeter of an interior surface of the extrusion channel, comprising:
1) placing an insert in one or more inlet ports and extrusion channels so that an external surface of said insert engages the interior surface of the extrusion channel;
2) forming a pocket around said insert between the circumference or perimeter of the inlet port and said external surface of said insert;
3) filling said pocket around said insert with molten metal by metal deposition using welding, wherein said insert prevents said molten metal from entering the extrusion channel;
4) allowing said molten metal to form hardened abrasion resistant metal, and removing said insert from the extrusion channel, thereby forming a new inlet port having the same circumference or perimeter as the interior surface of the extrusion channel and having a cutting edge, wherein said hardened abrasion resistant metal forms an 85 to 95 degree angle between said interior surface of the extruder die and said internal surface of the extrusion channel; and
5) chamfering said cutting edge to facilitate flow through the extrusion channel.

10. The process of claim 9 wherein said insert has a melting point above 3000 degrees F., does not melt at welding temperatures, does not stick or adhere to said molten metal or to said hardened abrasion resistant metal, and will not explode when exposed to heat from said metal deposition.

11. The process of claim 10 wherein said insert is made of metal, metal oxide, or metal nitride or other heat resistant material, or is constructed as a water cooled device made of metal, metal oxide, or metal carbide.

12. The process of claim 10 wherein said insert is made of fused silicon oxide.

13. The process of claim 10 wherein said insert is coated with an oxide, graphite, carbide or other heat resistant material.

14. The process of claim 12 wherein said insert is coated with an oxide, graphite, carbide or other heat resistant material.

15. A process for repairing one or more inlet ports on an interior or exterior surface of an extruder die wherein each inlet port provides an opening into an extrusion channel and wherein a circumference or perimeter of the inlet port is greater than a circumference or perimeter of an interior surface of the extrusion channel, comprising:
1) placing an insert in one or more inlet ports and extrusion channels so that an external surface of said insert engages the interior surface of the extrusion channel, wherein said insert has a melting point above 3000 degrees F., does not melt at welding temperatures, does not stick or adhere to molten metal or to hardened abrasion resistant metal, and will not explode when exposed to heat from said metal deposition, wherein said insert is made of metal, metal oxide, or metal nitride, or is constructed as a water cooled device made of metal, metal carbide or other heat resistant material;
2) forming a pocket around said insert between the circumference or perimeter of the inlet port and said external surface of said insert;
3) filling said pocket around said insert with molten metal by metal deposition using welding, wherein said insert prevents said molten metal from entering the extrusion channel;
4) allowing said molten metal to form hardened abrasion resistant metal, and removing said insert from the extrusion channel, thereby forming a new inlet port having the same circumference or perimeter as the interior surface of the extrusion channel and having a cutting edge, wherein said hardened abrasion resistant metal forms an 85 to 95 degree angle between said interior surface of the extruder die and said internal surface of the extrusion channel; and
5) chamfering said cutting edge to facilitate flow through the extrusion channel.

16. The process of claim 15 wherein said insert is coated with an oxide, graphite, carbide or other heat resistant material.

17. A process for repairing one or more inlet ports on an interior or exterior surface of an extruder die wherein each inlet port provides an opening into an extrusion channel and wherein a circumference or perimeter of the inlet port is greater than a circumference or perimeter of an interior surface of the extrusion channel, comprising:
1) placing an insert in one or more inlet ports and extrusion channels so that an external surface of said insert engages the interior surface of the extrusion channel, wherein said insert is made of fused silicon oxide;

2) forming a pocket around said insert between the circumference or perimeter of the inlet port and said external surface of said insert;
3) filling said pocket around said insert with molten metal by metal deposition using welding, wherein said insert prevents said molten metal from entering the extrusion channel;
4) allowing said molten metal to form hardened abrasion resistant metal, and removing said insert from the extrusion channel, thereby forming a new inlet port having the same circumference or perimeter as the interior surface of the extrusion channel and having a cutting edge, wherein said hardened abrasion resistant metal forms an 85 to 95 degree angle between said interior surface of the extruder die and said internal surface of the extrusion channel; and
5) chamfering said cutting edge to facilitate flow through the extrusion channel.

18. The process of claim 17 wherein said insert is coated with an oxide, graphite, carbide or other heat resistant material.

19. The process of claim 17 wherein said welding is plasma arc welding, metal inert gas welding, or tungsten inert gas welding, or a combination thereof.

* * * * *